Feb. 15, 1955 C. E. KRAUS 2,701,970
FRICTION CONTACT TYPE SPEED CHANGER

Filed Jan. 17, 1951 3 Sheets-Sheet 1

INVENTOR.
CHARLES E. KRAUS
BY
*J. L. Bowen*
ATTORNEY

Feb. 15, 1955 C. E. KRAUS 2,701,970
FRICTION CONTACT TYPE SPEED CHANGER
Filed Jan. 17, 1951 3 Sheets-Sheet 2

INVENTOR.
CHARLES E. KRAUS
BY
ATTORNEY

Feb. 15, 1955　　　　　C. E. KRAUS　　　　　2,701,970
FRICTION CONTACT TYPE SPEED CHANGER
Filed Jan. 17, 1951　　　　　　　　　　　　3 Sheets-Sheet 3

FIG. 6

INVENTOR.
CHARLES E. KRAUS
BY
*J. L. Bower*
ATTORNEY

United States Patent Office 2,701,970
Patented Feb. 15, 1955

2,701,970

FRICTION CONTACT TYPE SPEED CHANGER

Charles E. Kraus, Rochester, N. Y., assignor to Excelermatic, Inc., a corporation of New York Application January 17, 1951, Serial No. 206,334

41 Claims. (Cl. 74—200)

My invention relates to change speed devices of the friction contact type. More particularly, my invention relates to devices of this kind in which one or more rolling elements are frictionally engaged by each of two races at the point of a contact surface, on either the race or the rolling element, which is generally inclined to the axis of the races. The speed ratio between the two races may then be changed by shifting the position of the points of contact between the rolling element and the races along the aforementioned contact surface.

The contact surface on the race or the rolling element may be a conical surface but it may also be some other rotational surface which is similarly inclined to the axis of the races. When viewed in cross section the contact surface of the race or rolling element may for example follow the arc of a circle. Thus, a speed changer is known in which the rolling elements are in the form of a number of balls which are circumferentially disposed about and frictionally engaged by two coaxial, disk shaped races of the same diameter and mounted end to end on the driving and driven shaft respectively. Each of the balls is mounted for rotation about an axle which is tiltably but otherwise fixably mounted in the housing of the unit. If the ball axles are tilted relatively to the axis of the races, the distance from the ball axis to the contact point between the balls and one race is decreased and the distance from the ball axis to the contact point between the ball and the other race is increased. The result is a corresponding change in the speed ratio between the two shafts.

It is an object of my invention to provide a new and improved speed changer of the friction contact type.

It is another object of my invention to provide a new and improved speed changer of this type in which bending and thrust stresses in the rotating parts of the device are largely avoided.

Another object of my invention is to provide a new and improved speed changer of the friction contact type in which the speed ratio is automatically changed in accordance with variations in load.

It is another object of my invention to provide in a friction contact type speed changer new and improved means for controlling the input torque at will.

Another object of my invention is to provide a new and improved transmission for automotive vehicles including a speed changer of the friction contact type.

It is another object of my invention to provide a new and improved transmission for automotive vehicles having a torque converter of the friction contact type with facilities to limit the speed ratio of this converter under certain driving conditions.

Still another object of my invention is to provide a new and improved transmission for automotive vehicles having a friction contact type speed changer which makes it possible to start the engine by pushing or rocking the vehicle.

Yet another object of my invention is the provision of a new and improved transmission for automotive vehicles having a friction contact type speed changer in which certain hydraulic controls such as an input torque control for the speed changer and a forward and reverse clutch control are caused rapidly to return to their normal condition when the vehicle is slowed down to idling speed.

Other objects and advantages of my invention will be better understood from the following description of my invention.

Preferred embodiments of my invention will now be described in detail with reference to the accompanying drawings in which:

Fig. 3 is a cross-sectional view similar to Fig. 1, showing on an enlarged scale a ball with a portion of its axle, a portion of the races engaging the balls and a set of sprags engaging the races. On its left side Fig. 3 illustrates the relative position between the balls and races for maximum speed up and on its right side for maximum speed reduction.

Figure 1:
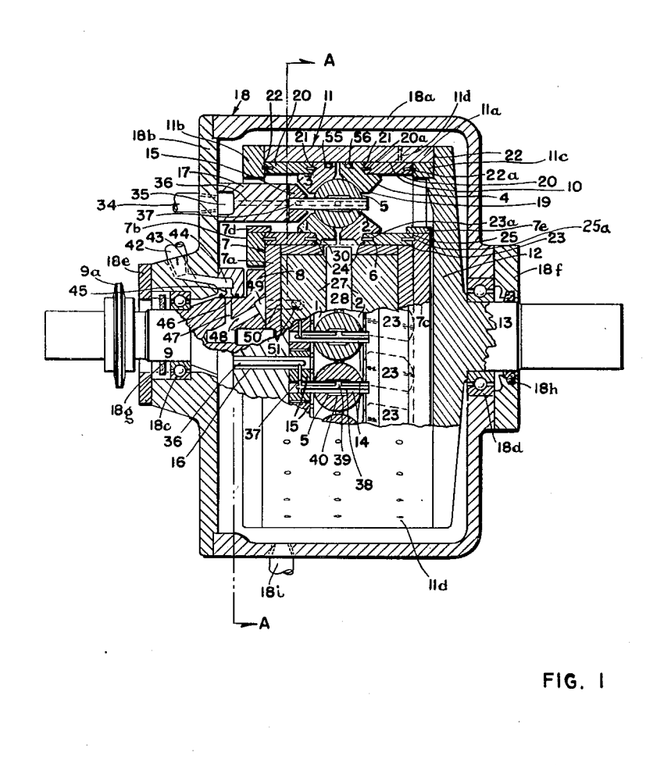
Fig. 1 is a longitudinal cross-sectional view along the line B—B shown in Fig. 2, of an embodiment of the change speed device according to my invention.
Figure 2:
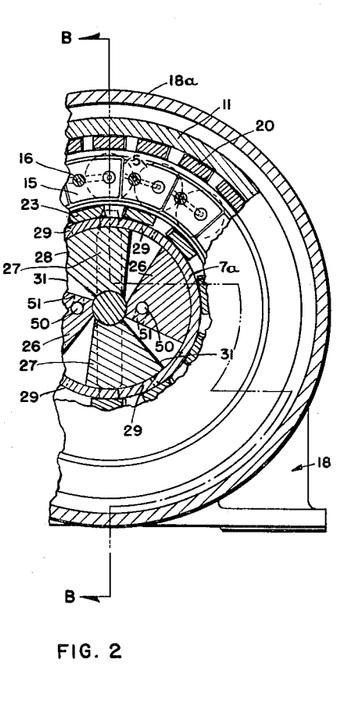
Fig. 2 is a transverse cross-sectional view, along the line A—A shown in Fig. 1, of this device.

Referring now to Figs. 1 and 2, the speed changer shown in these figures generally is similar to a ball bearing or roller bearing assembly in that it has inner races and outer races and a number of traction-transmitting rolling or rotatable elements therebetween, the rolling elements in the preferred embodiment of my invention being in the form of balls. The two inner races 1, 2 of the device are supported on the outer cylindrical wall 6 of a closed, composite casing 7 fixed to an end flange 8 of driving means such as an input shaft 9 while the two outer races, 3, 4 are supported by the inner cylindrical wall 10 of a composite casing 11 secured to an end flange 12 of driven means such as an output shaft 13, this casing being open at its left end, Fig. 1.

The inner composite casing 7 which rotates with input shaft 9 is made up of a main casing member 7a, two annular end members 7b, 7c respectively secured to one and the other end of main casing member 7a, and two ring members 7d, 7e respectively secured to the outer surface of one and the other of end members 7b, 7c, members 7d, 7e being of somewhat greater width than end members 7b, 7c. The outer composite casing 11 which rotates with output shaft 13 includes a main casing member 11a, an annular end member 11b secured to the left end of casing 11a and a second annular end member 11c secured to flange 12 of output shaft 13.

The speed changer unit is enclosed by a composite housing 18 including a main housing member 18a and an end member 18b secured to member 18a and closing the open end thereof. This end member 18b rotatably supports input shaft 9 by means of a ball bearing assembly 18c and main housing member 18a supports output shaft 13 by means of another ball bearing assembly 18d. These two ball bearing assemblies are held in place by cover plates 18e and 18f suitably secured to housing members 18a and 18b, respectively; flexible sealing rings 18g and 18h are respectively associated with the two plates 18e and 18f in the usual manner.

As shown in the lower portion of Fig. 1, each of the traction-transmitting balls 5 is rotatably and slidably mounted on an axle 14 attached to a block 15 which, in turn, is rockably mounted by means of a pivot pin 16 on an annular support or carrier 17. This support is secured to the stationary speed-changer housing member 18a and extends from that member into the space between the cylindrical casings 7 and 11. While a floating suspension is thus provided for the balls 5 both radially and axially of the device the balls, by virtue of their pivotal mounting, are substantially restrained against movement in a direction circumferentially of the speed-changer. Therefore, if the inner races 1, 2 are driven in one direction, e. g. clockwise as viewed in Fig. 2, the outer races 3, 4 are by way of the balls 5 driven in the opposite direction, i. e. counter-clockwise in Fig. 2.

Figure 3:
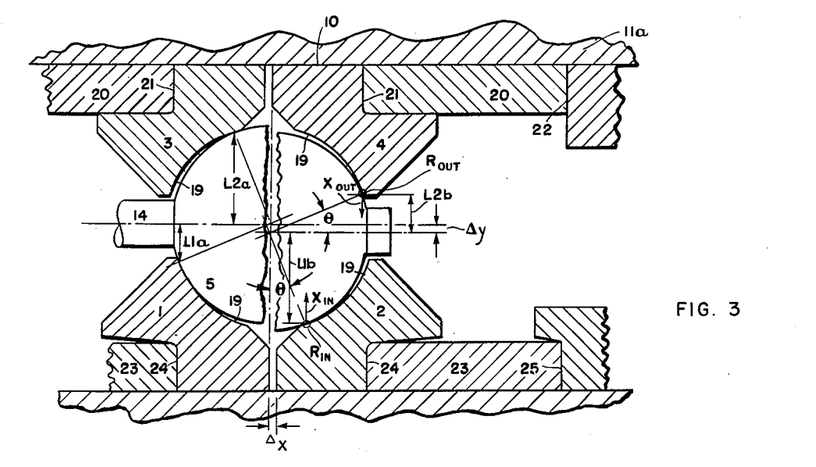

As more clearly shown in Fig. 3, all four races have a ball-engaging surface, indicated by a common numeral 19, the directrix of which follows the arc of a circle of a radius somewhat greater than that of balls 5. As a result each of the four races engages each ball at one contact point. Therefore, as the speed changer illustrated in Figs. 1 and 2 has sixteen balls, 32 inner and 32 outer friction contact points are available for the transmission of power from the input to the output side of the device. The points at which the inner and outer races contact the balls may be shifted along the contact surfaces between these parts, the contact surface between each ball and a given outer race being generally inclined to the axis of the races in one sense and the contact surface between each ball and the corresponding inner race being generally inclined to that axis in the opposite sense. Thus, referring to the left side of Fig. 3, if the inner races 1, 2 contact the balls 5 at points remote from the median plane common to the balls as indicated by short moment arm L1a and the outer races 3, 4 contact the balls at points close to that plane as indicated by long moment arm L2a an increase in the driving speed is obtained. Referring on the other hand to the right side of Fig. 3, if the inner races contact the balls at points close to the common median plane of the balls as indicated by long moment arm L1b and the outer races 3, 4 contact the balls at points close to that plane as indicated by short moment arm L2b a reduction of the driving speed will result.

As shown in Fig. 1 the two outer races 3, 4 are axially movable relative to shaft 13 on cylindrical casing member 11a and, in operation, are urged towards each other by the wedge or cam action of two circumferential sets or rows of outer sprags or wedging members 20. These sprags in the illustrated embodiment have cam-shaped surfaces at both ends, one of these cam surfaces engaging a side face 21 of the outer races and the other engaging relatively stationary surfaces which, in the present embodiment, are side faces 22 on end members 11c, 11b. Similarly, the two inner races 1, 2 are axially movable relative to shaft 9 on cylindrical casing member 7a and are laterally engaged by two circumferential sets or rows of inner sprags 23 shown on an enlarged scale in Fig. 3. These sprags 23 also have cam-shaped surfaces at both ends, one surface engaging side face 24 on the inner races and the other engaging relatively stationary surfaces, in the present instance reaction faces 25 on end members 7b, 7c of casing assembly 7 which rotates with the input shaft. The drive of the inner races is effected by means of a key member 28 in a manner described hereafter. Ring members 7d and 7e serve to hold the inner sprags 23 in place. While a particular form of sprag is illustrated herein, any shape and arrangement providing the desired camming or wedging action may be used.

If the output torque or load on output shaft 13 increases, the increased drag on flange surfaces 22 will rock the outer sprags 20 in the direction of their locking position, thereby forcing the two outer races 3, 4 toward each other. As a result, each ball is swung about its associated pivot pin 14 radially inwardly of the device and this radial displacement of the balls causes the points of contact between the balls and the outer races to be shifted away from the common median plane of the balls as clearly shown on the right side of Fig. 3. The radial inward movement of the balls 5, in turn, moves the two inner races 1, 2 away from each other and thereby shifts the points of contact between these lower races and the balls closer together. With the moment arm on the driving side of the balls lengthened and on the driven side shortened a reduction in speed will thus be obtained. By the same token, a step-up in speed will result if the load on the driven shaft is decreased. It will, therefore, be seen that the device according to the invention functions as a torque converter in that it automatically and continuously changes the speed ratio in either direction in accordance with variations in load.

The device also makes it possible to set the input torque continuously at any desired value. This is accomplished by hydraulic pressure transmitting or control apparatus comprising a cylindrical control chamber formed in cylindrical casing member 7a which rotates with the input shaft 9 and, in that chamber, a plurality of fixed vanes 26 which are integral with casing member 7a and a plurality of movable vanes 27 which are integral with each other and are mounted in casing member 7a for angular movement about its axis. Secured to the circumferentially movable vanes 27 is key member 28 each of the diametrically opposed ends of which extends through an arcuate slot formed in cylindrical casing member 7a and having end walls 29, into an axial groove 30 in the inner races 1, 2. A pump (not shown) driven by a drive sprocket 9a on shaft 9 maintains the spaces 31 in the control chamber filled with a liquid, in the present embodiment oil, the pressure of which can be adjusted at will, e. g. by the setting of an adjustable relief valve 53. The liquid which fills spaces 31 serves as a hydraulic cushion between the fixed and movable vanes, this assembly being movable or yieldable in a circumferential sense because of the relative movement between the fixed and movable vanes depending upon whether the torque or load applied to the inner races 1, 2 is greater or less than the input torque setting. Any given pressure setting corresponds to a definite input torque. Thus, when input shaft 9 is driven the driving power is transmitted from the fixed vanes 26 through the liquid pressure in spaces 31 to the movable vanes 27, from there by means of key member 28 to both inner races, 1, 2 and from these races to the balls 5 whereby the inner race assemblies are circumferentially, as well as axially, movable with respect to shaft 9.

If the transmission of a greater torque by the input shaft is desired the pressure of the liquid in spaces 31 is increased by a corresponding change in the setting of the aforementioned relief torque control means 53. The angular position of the movable vanes 27 and, therefore, of the inner races 1, 2 will accordingly be advanced in relation to input shaft 9 and the inner sprags 23 rocked in the direction of their locking position (counter-clockwise in Fig. 4 and the lower portion of Fig. 1) so that the two inner races are moved closer to each other. The higher speed ratio which is thereby established, automatically results in the transmission by the input shaft of a greater torque for a given load. On the other hand, if the input torque is to be decreased the pressure in the control chamber will be lowered and a lower speed ratio automatically established.

In either case the torque selected by the hydraulic system control will be maintained within the ratio range of the speed changer, regardless of load variations. For instance, if the load should drop the outer races 3, 4 will move apart and the inner races 1, 2 will move toward each other as explained above, and the speed ratio of the device will be increased. As the inner races move together the inner sprags 23 will swing in the direction of their locking position (counter-clockwise as viewed in Fig. 4 and the lower portion of Fig. 1) and, as a result, the inner races 1, 2 and movable vanes 27 are caused to move ahead in phase with respect to input shaft 9. The volume of spaces 31 between the fixed and movable vanes will therefore be increased but as the pump will readily furnish the additional oil required to keep the oil pressure at its former level, the torque transmitted by the input shaft will not be affected thereby. The opposite takes place if the load should go up, i. e. the inner races and movable vanes will, under the control of inner sprags 23, be caused to fall back in phase relatively to the input shaft; consequently, some of the oil will bleed out of spaces 31 but this, too, will have no effect on the input torque as the oil pressure is maintained at a constant level by the setting of the relief valve.

As shown in Fig. 1, coil springs 55 and 56 are provided in corresponding circumferential grooves of outer races 3, 4 to insure engagement of the balls by the races under all load conditions. Each of these springs is at one end connected to a pin (not shown) in casing member 11a and at the other end to a pin (not shown) in the associated race. Thus, a bias is impressed on races 3, 4 in a circumferential direction. Since, due to the action of sprags 20, this bias is accompanied by a corresponding bias axially of the device, the effect is that races 3 and 4 are pulled toward each other and, therefore, against balls 5 at a light initial pressure.

It has been mentioned above that the speed changer according to the invention provides a considerable number of contact points, 2×32 in the embodiment shown, over which tractive forces can be transmitted from the input to the output side. It is largely for this reason that the present friction-contact device which, because of the wedge action of the sprags is non-slipping, can be built in units of considerable power rating whereby new applications for devices of this kind are opened up.

In order to take full advantage of the stress range of the materials used for balls and races and thereby further increase the power capacity of the speed changer according to the invention, provisions have been made to keep the contact forces between the races and the balls at a minimum under all conditions.

Figures 4, 5:
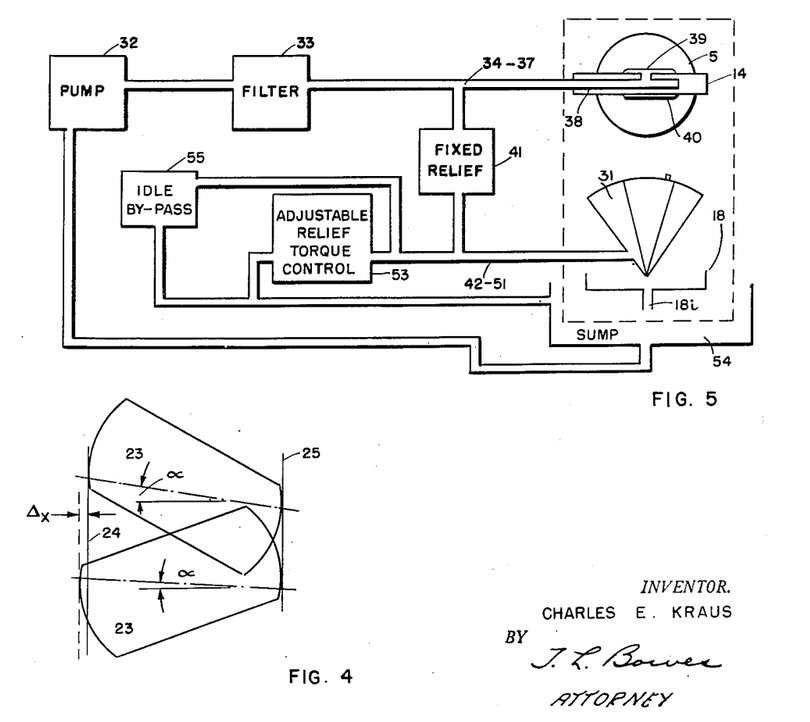
Fig. 4 is a plan view, on an enlarged scale of one of the sprags shown in Figs. 1–3, this figure showing the sprags in their two extreme positions relatively to the surfaces engaged thereby and thus illustrating the wedge action exerted by the sprags on the races.
Fig. 5 is a schematic diagram illustrating, in schematic form, the hydraulic oil system providing lubricant under pressure for lubrication and input torque control of the change speed device shown in Figs. 1 and 2.

It will readily be seen that for the transmission of the necessary tractive effort at the contact points between the races and each ball a lesser lateral force, axially of the device, is required when the contact points are close to the common median plane of the balls than when they are farther away from that plane. This is so because the wedge action of the races on the balls increases the closer the contact point moves to the aforementioned plane. The cam surfaces of both the inner sprags 23 and outer sprags 20 have accordingly been designed to take this change in the amount of wedge action into account. More specifically, with $\mu$ representing the coefficient of friction, $\Theta$ the contact point angle as indicated in Fig. 3 and $\alpha$ the effective wedge angle of the sprags as shown in Fig. 4, the cam surfaces are preferably designed to follow the relation $$\tan \alpha = \frac{\mu}{\sin \Theta}$$

For the same reason, the cam surfaces of the sprags have been designed so that the force exerted by the outer races on the balls is the same as the force exerted by the inner races on the balls, radially of the device. As shown in Fig. 3 this condition is met if, for each pair of contact point positions, the line drawn from the outer contact point to the ball center is at a right angle to the line drawn from the inner contact point to the ball center.

With $\mu$ again being the coefficient of friction, $\Theta$ being the contact point angle as shown in Fig. 3, $R_{in}$ and $R_{out}$ being the forces respectively exerted by the inner and outer races radially of the ball, $T_{in}$ and $T_{out}$ being the traction forces respectively exerted by the inner and outer races tangentially of the ball, and $X_{in}$ and $X_{out}$ being the resultant forces exerted in a direction perpendicular to the ball axle, i. e. radially of the races, the following relations which are obvious from Fig. 3 demonstrate the above right-angle requirement:

$$T_{in} = \mu R_{in} \quad (1)$$
$$T_{out} = T_{in} \tan \Theta = \mu R_{in} \tan \Theta \quad (2)$$
$$X_{in} = \mu R_{in} \cos \Theta \quad (3)$$
$$X_{out} = \mu R_{in} \tan \Theta \sin \Theta \quad (4)$$
$$X_{in} = X_{out} \quad (5)$$

It will be appreciated that the distance $\Delta y$ in Fig. 3 denotes the maximum displacement of the ball axle radially of the speed changer according to the embodiment shown. This maximum radial displacement of the balls corresponds to a maximum lateral displacement $\Delta x$, Figs. 3 and 4, of each race in accordance with a rocking movement of the sprags from their full-line position, Fig. 4, in which their effective wedge angle is $\alpha$ to their broken-line position, Fig. 4, in which their effective wedge angle is $\alpha'$.

An important feature of the invention is that two driving and two driven races are provided, one driving and one driven race on each side of the balls. Accordingly two contact points are available for transmitting the driving power to each ball and two contact points for conveying this power from each ball. This feature also results in a balancing of the various forces with respect to the ball axles as well as the input and output shafts.

Due to the floating suspension of the balls described above, the balls are free to adjust themselves radially as well as axially of the device to the forces exerted upon them by the four races. Moreover, the ball axles remain under all conditions oriented substantially parallel to the axis of the device. It follows that the only force substantially acting upon ball axle 14 is a reaction force perpendicular to the axle. All other forces are taken up by the balls themselves and are, therefore, kept from setting up bending or thrust stresses in the ball axles.

It will be recalled that in the present device the driving power is transmitted from the outer races lengthwise of sprags 20 and through faces 22 on outer casing members 11c, 11b to the output shaft. Consequently, the lateral forces exerted by the two rows of sprags 20 in opposite directions are absorbed by casing assembly 11 and any bending stress or axial thrust on output shaft 13 is, therefore, eliminated. Similarly, the traction forces exerted by the two rows of inner sprags 23 act on lateral faces 25 of inner casing members 7b, 7c in opposite directions, whereby these forces are short-circuited directly through the inner casing assembly and bending or thrust stresses on input shaft 9 also are avoided.

To insure that all sprags move together and take a proportionate share of the load, each of sprags 20 and 23, Fig. 1, is provided at both ends with pins 20a and 23a respectively which engage holes 22a and 25a respectively in the end members of the associated casing assemblies.

The schematic diagram shown in Fig. 5 illustrates the way in which the hydraulic liquid delivered by the pump furnishes the liquid under pressure required for the hydraulic torque control described above and also affects the necessary lubrication for the speed changer mechanism. The oil is conveyed by means of pump 32 from sump 54 through filter 33 and passages 34—37, a longitudinal duct 38 in each ball axle 14 and a port 39 therein to an annular groove 40 in balls 5 to provide forced lubrication for the bearing surfaces between each ball 5 and its axle 14. As shown in Fig. 1, passages 34—37 include an inlet conduit 34, an annular groove 35 and a number of bores 36 in support 17, and a duct 37 in each of blocks 15. After passing the aforementioned bearings in both axial directions, the oil enters the space between the inner casing assembly 7 and the outer casing assembly 11 in the form of a fog in a manner well known in the art and thereby provides fog lubrication for races 1—4 and sprags 20 and 23. Passages 11d in casing member 11a allow free escape of the oil into the space in housing 18 which surrounds outer casing assembly 11. From there the oil may pass into sump 54 through a conduit 18i connected to the bottom of housing 18, as shown in Figs. 1 and 5.

Fixed relief valve 41, Fig. 5, maintains the lubricating system at a predetermined pressure. As the pressure of the oil delivered by pump 32 exceeds the pressure at which fixed relief valve 41 is set, oil under pressure is delivered through this valve, oil inlet 42, 43, Fig. 1 and passages 44—51 to spaces 31 in the hydraulic control chamber. These passages include annular grooves 44, 46 and bores 45 in a stationary ring member 18j secured to housing member 18b and having two sealing rings 18k; bores 47, 48 and 49 in flange 8 of the input shaft 9; and bores 50 and 51 in inner casing member 7a and the two fixed vanes 26 which are integral therewith. The pressure in spaces 31 can be set at will by means of adjustable relief valve 53, Fig. 5, which may be manually adjustable, for example, to maintain the input torque at any desired value as described above. The oil passing through valve 53 exhausts into sump 54.

An idle by-pass 55 shown in Fig. 5 may be provided if the unit is used as a speed-changer device in a transmission interposed between the engine and the driven wheels of an automotive vehicle, this application being more fully described hereinafter. Idle by-pass 55 is preferably in the form of a needle valve, not shown, which serves to "starve" torque control spaces 31 when the engine of the vehicle is idling. When the engine, e. g. by means of the accelerator of the vehicle, is slowed down to idling speed the output of pump 32 is correspondingly reduced but the pressure in spaces 31 and, therefore, the input torque of the speed changer may not always drop fast enough to keep the engine from stalling. In such cases idle by-pass 51 permits the oil rapidly to bleed out of spaces 31 under this condition so that the pressure in these spaces collapses and the input torque is reduced to its minimum value without delay.

Figure 6:
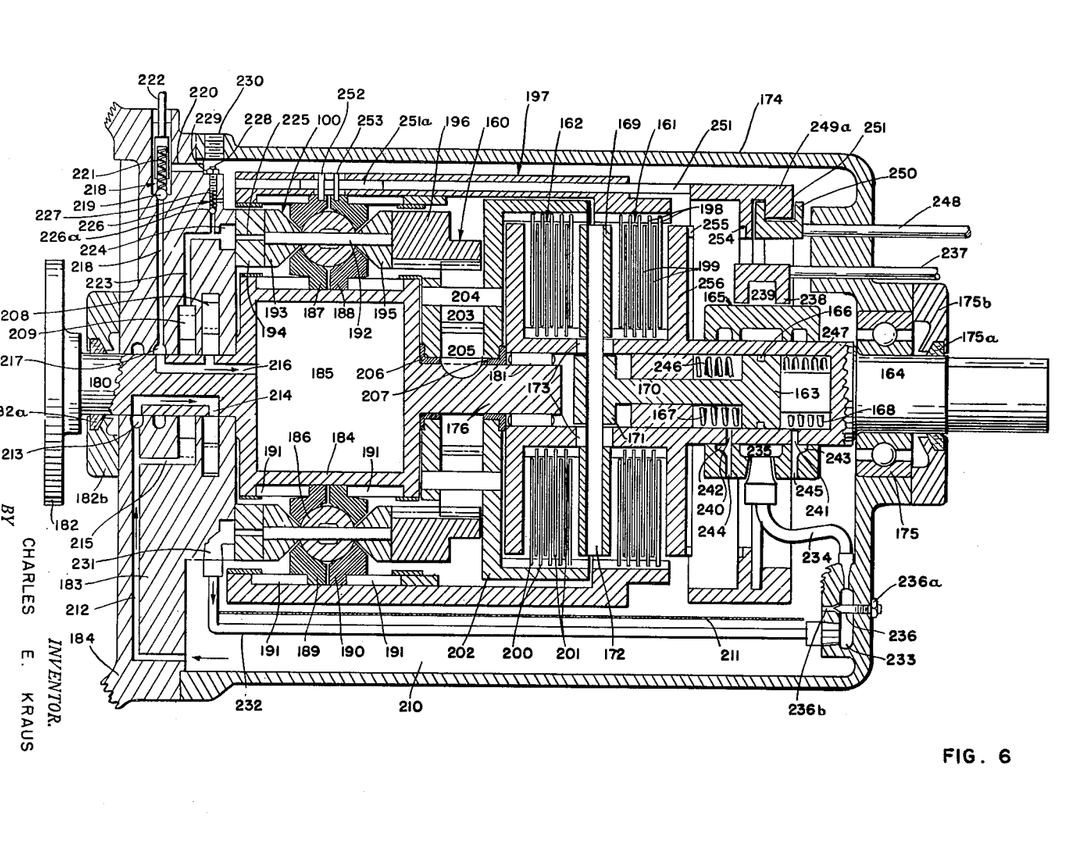
Fig. 6 is a longitudinal cross-sectional partially schematic view of a transmission for automotive vehicles including a modified embodiment of the change speed device shown in Figs. 1 and 2.

Referring now to Fig. 6, there is shown a transmission for automotive vehicles incorporating a stepless speed changer or torque converter generally similar to that shown in Figs. 1 and 2, this modified speed changer as a whole being designated in Fig. 6 by the numeral 100.

The transmission shown in Fig. 6, in addition, includes a planetary gearing 160 for reverse drive, a first multiple-disk friction clutch 161 for establishing forward drive through the friction-contact speed changer 100 and a second multiple-disk friction clutch 162 to establish reverse drive through the planetary gearing 160. The two clutches are controlled by a hydraulic piston 163 axially slidable in final driven shaft 164, this piston, in turn, being controlled by a control valve 165 slidably carried by shaft 164.

Hydraulic piston 163 which has a piston ring 166 and is urged toward its neutral position by coil springs 167 and 168 controls the actuating plate 169 of the two multiple-disk clutches by means of a piston rod 170 having a cylindrical boss 171 at its other end, the aforementioned actuating plate 169 being connected to this boss by a rod 172 extending transversely through slots 173 in final driven shaft 164. Shaft 164 is rotatably supported at one end in main housing member 174 of the transmission by means of a ball bearing assembly 175 having a flexible sealing ring 175a and a cover plate 175b associated therewith; and at the other end rotatably supported on an extension 176 of driving shaft 180 by means of bearing assembly 181, driving shaft 180 in turn being secured by means of flange 182 to a flange (not shown) on the crank shaft of the automotive vehicle. A flexible sealing ring 182a and an associated cover plate 182b are also provided at this end of the transmission. At its left end transmission housing member 174 is closed and carried by another housing member 183 which is secured, by means of flange portion 184, to the engine casing (not shown).

Formed in the central portion of driving shaft 180 is a cylindrical casing 184 generally corresponding to casing assembly 7, Figs. 1 and 2 and forming a hydraulic control chamber 185 which houses a set of fixed vanes and movable vanes (not shown) similar to the fixed vanes 26 and movable vanes 27 of the speed changer shown in Figs. 1 and 2. The speed changer of the present embodiment also includes a number of traction-transmitting balls 186, two inner races 187, 188 and two outer races 189, 190 and four rows of sprags 191, all these components substantially corresponding to the similar components illustrated in Figs. 1 and 2. However, in the present embodiment the ball axles 192 are supported at both ends, viz, at one end by arms 193 pivotally mounted in annular member 194 secured to stationary (relatively to the vehicle) housing member 183 and at the other end by arms 195 pivotally mounted in a likewise stationary ring gear 196. This ring gear is fixedly secured to annular member 194 by means of a plurality of mounting studs which extend in spaced relation through the speed changer between adjacent balls 186, these studs in the cross section of Fig. 6 being hidden from view by the ball axles 192 with which they are parallel.

The speed changer of the present embodiment also has an outer casing assembly 197 generally similar to casing assembly 11, Figs. 1 and 2. However, assembly 197 in the present case merely constitutes an intermediate driven member, having at its far right end, as viewed in Fig. 6, and keyed thereto one set of disks 198 of forward multiple disk clutch 161 while the other set of disks 199 of this clutch is keyed to final driven shaft 164. Also keyed to final driven shaft 164 is one set of disks 201 of reverse multiple disk clutch 162, the other set of disks 200 of this reverse clutch being keyed to carrier 202 of planetary gearing 160. A number of planetary pinions 203 are rotatably mounted on this carrier 202 by means of axles 204, and these pinions mesh on one side with a sun gear 205 keyed to extension 176 of driving shaft 180 and on the other side with the aforementioned stationary ring gear 196. Planetary carrier 202 is mounted for rotation on driving shaft extension 176 by means of bearing sleeves 206, 207.

Keyed to the left portion of driving shaft 180 are the rotating members of two pumps 208 and 209 the first of which serves to furnish oil under pressure to input torque control chamber 185 while the second serves to convey oil under pressure to ball axles 192 for lubrication and also to clutch control valve 165 for the operation of clutch control piston 163. The input side of both of these pumps communicates with a sump 210 formed at the bottom of housing member 174 and separated therefrom by a perforated splash guard 211. Pump 208 is connected with sump 210 through duct 212, an annular passage 213 in housing member 183 and a U-shaped duct 214 in driving shaft 180; and pump 209 is connected with this sump by way of ducts 212, 215. On its output side, pump 208 communicates with input torque control chamber 185 through a duct 216 in shaft 180, this duct also being in communication, by way of annular passage 217 and duct 218 in housing member 183 with adjustable relief valve 218 through which the oil delivered by pump 208 may exhaust past spring-biased ball 219 and an exhaust port 220 into the interior of the transmission housing. The tension of compression spring 221 acting on ball 219 may be varied from the outside of the transmission housing by a longitudinally movable rod 222. In this manner the oil pressure in chamber 185 and, accordingly, the input torque of speed changer 100 may be set at any desired value. If necessary an idle by-pass similar to idle by-pass 55, Fig. 5, may be provided in shunt with adjustable relief valve 218.

Pump 209 on its output side communicates through a duct 223 and an annular passage 224 in housing member 183 with ducts 225 in annular member 194 through which the oil is conveyed by way of ducts (not shown) similar to ducts 38, 39 Fig. 1, to balls 186 to provide pressure lubrication for the bearing surfaces between balls 186 and axles 192 and fog lubrication for races 187—190 and sprags 191. The pressure in annular passage 224 may be controlled by adjustable relief valve 226 comprising a ball 226a held against its seat by spring 227 the pressure of which may be adjusted by means of screw 228 and nut 229, these last mentioned two parts being accessible through an opening 230 in housing member 174.

Connected to annular passage 224 by way of duct 231 is a pipe 232 leading to a chamber 233 in housing member 174, this chamber 233 communicating through a conduit 234 which may be a short length of flexible hose, with a central annular chamber 235 in control valve 165. Associated with chamber 233 is a needle valve 236 which may be adjusted with the aid of nut 236a to control the rate at which the oil in chamber 233 may bleed out through port 236b into the interior of the transmission housing. This needle valve which, in effect, forms a by-pass with respect to relief valve 226, serves to control the speed at which the multiple disk clutches are automatically disengaged by the action of springs 167, 168 when the engine is slowed down to idling speed.

Slide valve 165 is manually controlled through an actuating rod 237 by a three position lever (not shown but which may be mounted on the steering column of the vehicle, for example), a fork 238 at the end of this rod engaging a central flange 239 on slide valve 165. With the control lever in its neutral position the slide valve is in the condition shown in the drawing in which both ports 240, 241 of this valve are connected to exhaust through annular passages 242, 243 and ducts 244, 245 in the control valve so that both clutches are disengaged. When the control lever is moved to "forward," slide valve 165 is shifted by rod 237 toward the left as viewed in Fig. 6 so that liquid under pressure is admitted from central chamber 235 through port 240 into a chamber 246 to the left of piston 163. As a result piston 163 is moved to the right and friction clutch 161 engaged to connect the output casing 197 of speed changer 100 to final driven shaft 164. This establishes a forward driving connection from input shaft 180 through speed changer 100 and friction clutch 161 to final driven shaft 164 of the transmission and from there to the wheels of the vehicle.

When the control lever is moved to "reverse," rod 237 is shifted to the right so that pressure liquid is admitted through port 241 into a chamber 247 to the right of piston 163. Consequently piston 163 is moved to the left whereby friction clutch 162 is brought into engagement. This couples the final driven shaft 164 to planet carrier 202. It will be seen therefore that with the control lever in reverse position a driving connection is established from input shaft 180 through sun gear 205, planet pinions 203, planet carrier 202, friction clutch 162 to final driven shaft 164 in a reverse direction to the forward drive. It should be noted that in addition as friction clutch 161 is disengaged under this condition, output casing 197 of the speed changer is also disengaged and, therefore, is idling and no power is transmitted by way of races 187—190 and balls 186 in this case.

In order to insure motor brake action in down hill driving, provisions have been made to enable the operator of the vehicle to establish a one-to-one speed ratio (direct drive) at will. This is in accordance with the requirement of overdrive cut-out facilities under the laws of several states.

In the transmission shown in Fig. 6 a one-to-one driving ratio may be set up by moving an actuating rod 248 which is connected to a controlling linkage (not shown) to the left so that annular member 249 is also shifted to the left, viz. by engagement of a fork 250 at the end of rod 248 with a rib 251 on member 249. Annular member 249 is carried by a plurality of circumferentially spaced rods 251 which are slidable in casing assembly 197.

The extreme end portion 251a of each rod 251 which is tapered engages two pins 252, 253 respectively mounted in outer races 189 and 190. This forms a stop for the circumferential phase shift of these races, the circumferential position of this stop being adjustable by lengthwise adjustment of rod 251. As a result, the angle by which these races are allowed to fall back with respect to output casing 197 when they are driven by that casing under motor-brake conditions, is limited by the engagement of pins 252, 253 with rod 251, and the amount by which sprags 191 allow these races to move apart is correspondingly limited. In this manner any desired fixed ratio such as one-to-one can by proper design of stop means 251, 252, 253 be set up for the transmission of power from the wheels to the engine.

It will be noted from Fig. 6 that with rods 251 moved all the way to the left, ratchet teeth 254 on annular member 249 engage corresponding ratchet teeth 255 on flange 256 of final driven shaft 164, whereby a unidirectional driving connection between final driven shaft 164 and output casing 197 of the speed changer is established independently of forward friction clutch 161. Ratchet teeth 254 and 255 are formed in such a way that when shaft 164 is driven through the speed changer and friction clutch 161 in ordinary forward operation of the car, the unidirectional clutch represented by teeth 254, 255 is ineffective; but when torque is transmitted in the opposite direction the clutch becomes effective. Thus if in case of failure of the automatic starting mechanism, rod 248 is manually actuated to the left and the car then pushed from the outside in a forward direction to start the engine, a driving connection will be established from final shaft 164 to input shaft 180 in spite of the fact that the pump is inoperative and forward clutch 161 cannot be engaged under that condition; and because of the engagement of stop means 251, 252, 253 this driving connection will be at a one-to-one speed ratio.

Moreover, should the operator attempt to start the engine in this manner by rocking the car back and forth, the engine will thus be cranked in the proper sense of rotation while the car is moved forward, but due to the unidirectional action of clutch 254, 255 no power will be transmitted to the engine while the car is moved in the opposite direction.

It will be seen from the above that only a single actuating mechanism, viz. rod 248 and its associated control linkage, is required to cut out the overdrive for motor brake purposes and to put the transmission in a condition where the engine may be started by moving the car.

While I have shown and described particular embodiments of my invention it will be obvious to those skilled in the art that changes and modifications may be made without departing from my invention in its broader aspects. For example, many different sprag arrangements and shapes may be utilized and my invention may be employed with different types of transmissions and clutches. I, therefore, aim in the appended claims to cover all such changes and modifications as fall within the true spirit and scope of my invention.

What is claimed is:

1. In a change speed device of the friction contact type, a pair of inner races, a pair of outer races coaxially disposed with respect to said inner races, a plurality of traction transmitting rolling elements radially interposed between said two pairs of races and axially interposed between the races of each pair, a carrier coaxial with said races, means supporting said elements on said carrier so as to permit bodily displacement of said balls radially of said races, cam means on each side of said elements for moving the races of one of said race pairs laterally toward each other under increased load and other cam means on each side of said elements for yieldingly urging the races of the other race pair laterally against said elements whereby a lateral relative movement of the races of the first race pair in one sense will, because of the resultant radial displacement of said elements, effect a lateral relative movement of the races of the other pair in the other sense and thus effect a corresponding change in speed ratio.

2. A combination as claimed in claim 1 characterized in that the rolling elements comprise balls, the directrix of the ball-engaging surface of each of said races is the arc of a circle having a radius greater than that of the balls.

3. The combination as claimed in claim 1 characterized in that said cam means have cam surfaces designed to urge said races laterally against said elements with a force which varies in accordance with the lateral position of said races so as to keep the contact forces between said elements and said races substantially constant irrespective of the change in wedge action between the elements and races with the position of the point of contact therebetween.

4. The combination as claimed in claim 1 characterized in that the rolling elements comprise balls and said cam means have cam surfaces designed to control the lateral movement of said inner and outer races so that for each pair of contact point positions on the same side of said balls, the line drawn from the point of contact of the outer race with a ball to the ball center is at right angles to the line drawn from the point of contact of the inner race with said ball to the ball center, whereby for all positions of the races the force exerted by the outer races on the balls is the same as the force exerted by the inner races on the balls, radially of the races.

5. The combination as claimed in claim 1 characterized in that said first-mentioned and second-mentioned cam means comprise two circumferential rows of sprags, one row on each side of the elements, each of said sprags having race controlling cam surfaces at each end.

6. A change speed device of the friction contact type comprising a driving member, a driven member, first race means operatively connected to said driving member, second race means coaxially disposed with respect to said first race means and operatively connected to said driven member, traction transmitting rolling means interposed between said first and second race means and frictionally engaged by each of said race means at the point of a contact surface which is generally inclined to the axis of said two race means in one and the other direction respectively, the relative positions of said rolling means and said race means determining the speed ratio between said members, cam means interposed between one of said members and the associated race means for moving said member and race means axially with respect to each other in response to a change in the output torque, thereby to shift the position of the points of contact between said rolling means and first and second race means in opposite directions and means for establishing a predetermined input torque, whereby the speed ratio is changed in accordance with changes in output torque to maintain said input torque at substantially said predetermined value independently of the value of the output torque throughout the speed ratio range of said device.

7. A change speed device of the friction contact type comprising a driving member, a driven member, first race means operatively connected to said driving member, second race means coaxially disposed with respect to said first race means and operatively connected to said driven member, traction transmitting rolling means interposed between said first and second race means and frictionally engaged by each of said race means at the point of a contact surface which is generally inclined to the axis of said two race means in one and the other direction respectively, the relative positions of said rolling means and said race means determining the speed ratio between said members, cam means interposed between said driving member and said first race means for relatively moving said driving member and said first race means in an axial direction responsive to a change in the output torque, thereby to shift the position of the points of contact between said rolling means and first and second race means in opposite directions, and input torque control means operative according to changes in output torque to maintain said input torque at a substantially constant value, whereby the speed ratio between said members is changed in accordance with the setting of said input torque control means.

8. A change speed device as claimed in claim 7, characterized in that said input torque control means includes a chamber formed in said driving member, two vanes mounted for relative angular movement in said chamber, one of said vanes being operatively connected to said driving member and the other to said first race means, a source of liquid under pressure communicating with said chamber, and means for controlling the pressure of the liquid in said chamber.

9. A change speed device of the friction contact type, comprising a driving member, a driven member, first race means, second race means, and carrier means, said three means being coaxially disposed with respect to each other, and said driving member being operatively connected to the first race means and said driven member operatively connected to another of the above-mentioned three means, a plurality of traction transmitting rolling elements radially interposed between said first and second race means, each frictionally engaged by one of said race means at a point of a contact surface which is generally inclined to the axis of said race means in one sense and by the other race means at a point of a contact surface which is generally inclined to said axis in the opposite sense, means supporting said elements on said carrier means for rotation about an axis parallel to that of the race means so as to permit bodily displacement of said elements radially of said race means, control means circumferentially interposed between one of said members and the associated race means, cam means laterally interposed between the last-mentioned race means and a laterally stationary surface, and means yieldingly urging the other race means laterally against said elements, whereby a change in angular phase between said one member and its associated race means due to a variation in the setting of said control means will effect a lateral movement of said last-mentioned race means in one direction and, because of the resultant radial displacement of said elements effect a lateral movement of the other race means in the opposite direction, so that the speed ratio is changed in accordance with the setting of the control means.

10. A change speed device of the friction contact type, comprising a driving member, a driven member, first race means, second race means, and carrier means, said three means being coaxially disposed with respect to each other, and said driving member being operatively connected to the first race means and said driven member operatively connected to another of the above-mentioned three means, a plurality of traction transmitting rolling elements radially interposed between said first and second race means, each frictionally engaged by one of said race means at a point of a contact surface which is generally inclined to the axis of said race means in one sense and by the other race means at a point of a contact surface which is generally inclined to said axis in the opposite sense, means supporting said elements on said carrier means for rotation about an axis parallel to that of the race means so as to permit bodily displacement of said elements radially of said race means, cam means laterally interposed between said second race means and a laterally stationary surface, other cam means laterally interposed between said first race means and another laterally stationary surface and input torque control means circumferentially interposed for yielding movement between said driving member and said first race means, whereby both a variation in load and a variation in the setting of the input torque control means will effect a lateral movement of said first and second race means in opposite directions and thereby bring about a corresponding change in speed ratio.

11. A change speed device as claimed in claim 10, characterized in that said input torque control means includes a chamber formed in said driving member, two vanes mounted for relative angular movement in said chamber, one of said vanes being operatively connected to said driving member and the other to said first race means, a source of liquid under pressure communicating with said chamber, and means for controlling the pressure of the liquid in said chamber, thereby to change the angular phase between said driving member and said first race means.

12. A change speed device as claimed in claim 10, characterized in that said supporting means comprises a plurality of supports, each supporting one of said elements for rotation about an axis parallel to that of the race means, and each mounted on said carrier for limited movement parallel to its axis and substantially radially of said race means.

13. A change speed device of the friction contact type, comprising a driving member, a driven member, first race means operatively connected to said driving member, second race means coaxially disposed with respect to said first race means and operatively connected to said driven member, a plurality of traction transmitting rolling elements radially interposed between said first and second race means, each frictionally engaged by one of said race means at a point of a contact surface which is generally inclined to the axis of said race means in one sense and by the other race means at a point of a contact surface which is generally inclined to said axis in the opposite sense, a carrier coaxial with said race means, means supporting said elements on said carrier for rotation about an axis parallel to that of the race means so as to permit bodily displacement of said elements radially of said race means, cam means laterally interposed between said second race means and a laterally stationary surface on said driven member, other cam means laterally interposed between said first race means and a laterally stationary surface on said driving member and input torque control means circumferentially interposed for yielding movement between said driving member and said first race means, whereby both a variation in load and a variation in the setting of the input torque control means effect a lateral movement of said first and second race means in opposite directions and thereby bring about a corresponding change in speed ratio.

14. A change speed device as claimed in claim 13 characterized by resilient means circumferentially interposed between said second race means and said driven member, said resilient means acting in conjunction with said second cam means to urge said second race means laterally against said elements with a light pressure to insure engagement of said elements by both said first and second cam means under all load conditions.

15. A change speed device as claimed in claim 13 characterized in that said supporting means comprises a plurality of supports, each supporting one of said elements for rotation about an axis substantially parallel to that of the race means and each mounted on said carrier for limited movement of said elements parallel to its axis and substantially radially of said race means.

16. A change speed device as claimed in claim 13 characterized in that said input torque control means includes a chamber formed in said driving member, two vanes mounted for relative angular movement in said chamber, one of said vanes being operatively connected to said driving member and the other to said first race means, a source of liquid under pressure communicating with said chamber, and means for controlling the pressure of the liquid in said chamber, thereby to change the angular phase between said driving member and said first race means.

17. A change speed device of the friction contact type, comprising a driving member, a driven member, a first pair of races operatively connected to said driving member, a second pair of races coaxially disposed with respect to said first pair and operatively connected to said driven member, a plurality of traction transmitting balls radially interposed between said two pairs of races and axially interposed between the two races of each pair, a carrier coaxial with said races, means supporting said balls on said carrier for rotation about an axis parallel to that of the races so as to permit bodily displacement of said balls radially of the races, cam means laterally disposed between each race of said second pair and a laterally stationary surface on said driven member on the corresponding side of said balls, other cam means laterally interposed between each race of said second pair and a laterally stationary surface on said driving member on the corresponding side of said balls, and input torque control means circumferentially interposed for yielding movement between said driving member and said first pair of races, whereby both a variation in load and a variation in the setting of the input torque control means will effect a relative lateral movement of the races of said first and second pairs in opposite directions and thereby bring about a corresponding change in speed ratio.

18. A change speed device as claimed in claim 17 characterized in that both said first-mentioned and second-mentioned cam means comprise two circumferential rows of sprags, one row on each side of the balls.

19. A change speed device as claimed in claim 17 characterized in that said supporting means comprises a plurality of axles each supporting one of said balls for rotation about and sliding movement along an axis parallel to that of the races, a plurality of arms extending substantially circumferentially of said races, each of said arms carrying adjacent one end one of said axles and being pivotally mounted adjacent the other end on said carrier for limited rocking movement thereon.

20. A change speed device as claimed in claim 17 characterized in that said input torque control means includes a chamber formed in said driving member, two vanes mounted for relative angular movement in said chamber, one of said vanes being operatively connected to said driving member and the other to said first race means, a source of liquid under pressure communicating with said chamber, and means for controlling the pressure of the liquid in said chamber, thereby to change the angular phase between said driving member and said first race means.

21. A transmission for automotive vehicles including a driving member, an intermediate driven member and a final driven member, a change speed device of the friction contact type interposed between said driving member and said intermediate driven member, a planetary gear train for reverse drive at one end operatively connected to said driving member, a forward friction clutch interposed between said intermediate driven member and said final driven member, a reverse friction clutch interposed between the other end of said reverse gear train and said final driven member, and clutch control means for selectively engaging said forward or reverse clutch.

22. A transmission for automotive vehicles as claimed in claim 21 characterized in that said clutch control means includes a hydraulic piston for actuating one or the other of said clutches, a manually actuated reversing valve for controlling said piston and a source of liquid under pressure connected to said valve.

23. A transmission for automotive vehicles including a driving member, an intermediate driven member and a final driven member, a change speed device of the friction contact type interposed between said driving member and said intermediate driven member, a gear train for reverse drive, a forward friction clutch interposed between said intermediate driven member and said final driven member, a reverse friction clutch interposed between the other end of said reverse gear train and said final driven member, and clutch control means for selectively engaging said forward or reverse clutch, said change speed device comprising first race means operatively connected to said driving member, second race means coaxially disposed with respect to said first race means and operatively connected to said intermediate driven member, traction transmitting rolling means interposed between said first and second race means and frictionally engaged by one of said race means at a point of a contact surface which is generally inclined to the axis of said race means in one sense and by the other race means at a point of a contact surface which is generally inclined to said axis in the opposite sense, and cam means interposed between said second race means and said intermediate driven member for relatively moving said second race means and said intermediate driven member in an axial direction responsive to a change in the angular phase therebetween in accordance with a variation in load, in order to shift the position of the points of contact between said rolling means and first and second race means in opposite directions, whereby the speed ratio is changed in accordance with said variation in load.

24. A transmission as claimed in claim 23 characterized in that it includes manually operable means for limiting the angle by which the phase between said intermediate member and said second race means may be changed thereby to limit the speed ratio in downhill driving.

25. A transmission as claimed in claim 34 characterized in that it includes a manually operable unidirectional clutch in parallel connection with said forward friction clutch for establishing a driving connection from said final member back to said intermediate member irrespective of the functioning of said forward friction clutch, whereby the engine may be started by moving the car.

26. A transmission as claimed in claim 23 characterized in that it includes means for limiting the angle by which the phase between said intermediate driven member and said second race means may be changed thereby to limit the speed ratio under certain operating conditions, a unidirectional clutch in parallel connection with said forward friction clutch for establishing a driving connection from said final member back to said intermediate member irrespective of the functioning of said forward friction clutch, and operator controlled means for actuating both said limiting means and said unidirectional clutch, whereby the engine may be started at a limited speed ratio by moving the car.

27. A transmission for automotive vehicles, including a change speed device of the friction contact type comprising a driving member, a driven member, first race means, second race means and carrier means, said three means being coaxial with each other, and said driving member being operatively connected to the first race means and said driven member operatively connected to another of the above-mentioned three means; a plurality of traction transmitting rolling elements radially interposed between said first and second race means, each frictionally engaged by one of said race means at a point of a contact surface which is generally inclined to the axis of said race means in one sense and by the other race means at a point of a contact surface which is generally inclined to said axis in the opposite sense, means supporting said elements on said carrier means for rotation about an axis parallel to that of the race means so as to permit bodily displacement of said elements radially of said race means, cam means laterally interposed between said second race means and a laterally stationary surface, other cam means laterally interposed between said first race means and another laterally stationary surface and input torque control means circumferentially interposed for yielding movement between said driving member and said first race means, said input torque control means including a source of liquid under pressure, a hydraulic vane-motor connected to said source, an adjustable relief valve for controlling the pressure of said liquid in said motor, and a bypass for said relief valve for permitting the rapid reduction of the pressure in said motor when the speed of the vehicle is reduced to idling speed.

28. A transmission for automotive vehicles, including a driving member, an intermediate driven member and a final driven member, a change speed device of the friction contact type interposed between said driving member and said intermediate driven member, a gear train for reverse drive at one end operatively connected to said driving member, a forward friction clutch interposed between said intermediate driven member and said final driven member, a reverse friction clutch interposed between the other end of said reverse gear train and said final driven member, and hydraulically actuated clutch control means for selectively engaging said forward or reverse clutch; said change speed device comprising first race means operatively connected to said driving member, second race means coaxially disposed with respect to said first race means and operatively connected to said intermediate driven member, a plurality of traction transmitting rolling elements radially interposed between said first and second race means, each frictionally engaged by one of said race means at a point of a contact surface which is generally inclined to the axis of said race means in one sense and by the other race means at a point of a contact surface which is generally inclined to said axis in the opposite sense, a carrier coaxial with said race means, means supporting said elements on said carrier for rotation about an axis parallel to that of the race means so as to permit bodily displacement of said elements radially of said race means, cam means laterally interposed between said second race means and a laterally stationary surface on said intermediate driven member, other cam means laterally interposed between said first race means and a laterally stationary surface on said driving member and hydraulically operable input torque control means circumferentially interposed for yielding movement between said driving member and said first race means, whereby both a variation in load and a variation in the setting of said input torque control means will effect a lateral movement of said first and second race means in opposite directions and thereby bring about a corresponding change in speed ratio.

29. A transmission as claimed in claim 28, characterized in that it includes spring means associated with said hydraulic clutch control means and tending to hold said means in neutral position, a source of liquid under pressure for actuating said control means against the action of said spring means, an adjustable relief valve for controlling the liquid pressure in said hydraulic control means, a by-pass for said relief valve, said by-pass permitting said hydraulic clutch control means rapidly to return to neutral position under the action of said spring means to disengage said clutches automatically when the speed of the vehicle is reduced to idling speed.

30. A transmission as claimed in claim 28, characterized in that it includes spring means associated with said hydraulic clutch control means and tending to hold said means in neutral position, a pump supplying oil under pressure to said hydraulic clutch control means for actuating said control means against the action of said spring means and also supplying oil under pressure to said rolling element supporting means for lubricating said elements, and adjustable relief valve for controlling the liquid pressure in said hydraulic control means, and a by-pass for said relief valve, said by-pass permitting said hydraulic clutch control means rapidly to return to neutral position under the action of said spring means to disengage said clutches automatically when the speed of the vehicle is reduced to idling speed.

31. A transmission as claimed in claim 28, characterized in that it includes two separate oil pumps, one for supplying oil under pressure to said hydraulic input torque control means for actuating said means and the other for supplying oil under pressure to said hydraulic clutch control means for actuating said means and also supplying oil under pressure to said rolling-element supporting means for lubricating said elements, separate pressure adjusting means being provided for said two pumps.

32. A transmission as claimed in claim 28 characterized in that it includes a manually operable cam device for limiting the angle by which the phase between said intermediate driven member and said second race means may be changed under the control of said first-mentioned cam means thereby to limit the speed ratio under certain driving conditions, said manually operable cam device including a plurality of circumferentially spaced control elements actually movable in said intermediate member and a plurality of abutment elements on said second race means co-acting with said control elements.

33. In a change speed device of the mechanical type, driving means, driven means subject to changes in load or output torque, a race assembly arranged for both axial and circumferential motion relative to one of said means, and hydraulic pressure transmitting apparatus interposed between said race assembly and said one of said means, whereby a change in the load connected to said driven means causes said relative motion for maintaining a predetermined load on said driving means.

34. In a change speed device of the mechanical type, driving means, driven means subject to changes in load or output torque, a race assembly arranged for both axial and circumferential motion relative to one of said means, hydraulic pressure transmitting apparatus interposed between said race assembly and said one of said means, whereby a change in the load connected to said driven means causes said relative motion for maintaining a predetermined load on said driving means, and means for limiting said axial movement.

35. In a change speed device of the mechanical type, driving means, driven means, first race means operatively connected to said driven means, second race means, a plurality of rotatable elements interposed between said race means, circumferentially movable means interposed between said driving means and said second race means, the amount of circumferential movement being dependent upon the extent of any change in the ratio of the input torque applied to said driving means to the output torque, and externally adjustable means for presetting the torque required to cause said circumferential movement.

36. In a change speed device of the mechanical type, driving means, driven means, first race means operatively connected to said driven means, second race means, a plurality of rotatable elements interposed between said race means, circumferentially movable means interposed between said driving means and said second race means, and hydraulic means for controlling said circumferentially movable means for maintaining a predetermined load on said driving means.

37. In a speed ratio changing mechanism, driving means, driven means, a race assembly, a circumferentially disposed set of wedging members interposed between said race assembly and said driven means for effecting axial movement of said race assembly with respect to said driven means, and circumferentially movable means interposed between said race assembly and said driving means to permit relative circumferential movement therebetween.

38. In a speed ratio changing mechanism, driving means, driven means, a race assembly, a circumferentially disposed set of wedging members interposed between said race assembly and said driven means for effecting axial movement of said race assembly with respect to said driven means, circumferentially movable means interposed between said race assembly and said driving means to permit relative circumferential movement therebetween, and means for presetting the input torque supportable by such circumferentially movable means.

39. In a change speed device, a driving member, a driven member, a first pair of race means, a second pair of race means, a set of wedging members or sprags arranged between said second race means and said driven member in such a manner as to move said second race means closer together in response to an increase in output torque, hydraulic torque control apparatus disposed between said driving shaft and said first race means, a second set of wedging members or sprags associated with said first race means in such a manner as to permit said first race means to move apart as said second race means move together, and a plurality of rolling elements disposed between said pairs of race means, each of said elements being arranged for radial movement and individual rotation about the axis thereof but restrained from circumferential movement.

40. In a change speed device, a driving member, a driven member, a first pair of race means, a second pair of race means, a set of wedging members or sprags arranged between said second race means and said driven member in such a manner as to move said second race means closer together in response to an increase in output torque, hydraulic torque control apparatus disposed between said driving shaft and said first race means, a second set of wedging members or sprags associated with said first race means in such a manner as to permit said first race means to move apart as said second race means move together, and a plurality of rolling elements disposed between said pairs of race means, each of said elements being arranged for radial movement and individual rotation about the axis thereof but restrained from circumferential movement, said torque control apparatus being adjustable in order to establish a predetermined input torque setting at said driving member.

41. In a change speed device, a driving member, a driven member, a first pair of race means, a second pair of race means, a set of wedging members or sprags arranged between said second race means and said driven member in such a manner as to move said second race means closer together in response to an increase in output torque, hydraulic torque control apparatus disposed between said driving shaft and said first race means, a second set of wedging members or sprags associated with said first race means in such a manner as to permit said first race means to move apart as said second race means move together, a plurality of rolling elements disposed between said pairs of race means, each of said elements being arranged for radial movement and individual rotation about the axis thereof but restrained from circumferential movement, and means for limiting the relative movement of said second race means.

References Cited in the file of this patent

UNITED STATES PATENTS

| Number | Name | Date |
|---|---|---|
| 1,058,981 | Jensen et al. | Apr. 15, 1913 |
| 1,585,140 | Erban | May 18, 1926 |
| 1,616,311 | Esnault-Pelterie | Feb. 1, 1927 |
| 1,788,108 | Jacobsen | Jan. 6, 1931 |
| 2,083,656 | Madle | June 15, 1937 |
| 2,108,082 | Sharpe | Feb. 15, 1938 |
| 2,201,176 | Hayes | May 21, 1940 |

FOREIGN PATENTS

| Number | Country | Date |
|---|---|---|
| 477,537 | Great Britain | Jan. 3, 1938 |